Patented Sept. 4, 1951

2,566,842

UNITED STATES PATENT OFFICE 2,566,842

STARCH COMPOSITION

Chester Grey Landes, New Canaan, and John Studeny, Stamford, Conn., assignors to American Cyanamid Company, New York, N. Y., a corporation of Maine No Drawing. Application May 5, 1948, Serial No. 25,301

1 Claim. (Cl. 106—213)

This invention relates to converted starch adhesives and relates more particularly to converted starch adhesive and sizing compositions containing an agent serving to impart thereto greatly improved fluidity, stability, and adhesive characteristics.

The starch adhesive and sizing compositions embraced by the present invention include those which are of the directly-used type and also those of the remoistening variety. The starch adhesive compositions are those which are applied and which serve at once as adhesives between sheets of paper, wood plies, textile sheets, etc. as well as those which are applied to the surfaces of sheets of paper, textiles, and the like in film form and are then reactivated by a moistening treatment for bonding or union thereof with another material or surface. The sizing compositions are those which are suitable for textile sizing or the like applications, and those starch sizes which are suitable for application to the beater, stock chest, head box, tub press, calender, etc. applications in paper manufacture. Likewise, the starch compositions may be employed as binding adhesives in pigment coatings, printing pastes, and the like materials, for paper, textile, leather and other surfaces.

Ordinarily, the employment of aqueous dispersions of converted starch as adhesives or sizing materials is attended by a twofold disadvantage. First, the initial viscosity of the aqueous starch dispersion increases rapidly as the amount of converted starch therein is increased. For this reason, it is often impracticable to employ dispersions containing more than about 10-20% of converted starch according to the tub sizing, roll, and other commonly employed application treatments. Second, aqueous dispersions of converted starch are ordinarily quite fluid-unstable in that the materials increase in viscosity upon aging and after the lapse of a relatively short period of time become thick, unpourable hydrogels. For these reasons it has been the ordinary practice to prepare converted starch adhesive and sizing compositions containing relatively small amounts of starch and to use these compositions as quickly as possible in order to prevent excessive waste of the materials through gelling thereof.

We have found that the addition to converted starch adhesive or sizing compositions of a small amount of a compound of the class consisting of the lower alkyl-substituted and lower hydroxy-alkyl-substituted dicyandiamides imparts to the compositions greatly improved initial fluidity, fluid stability during storage, and adhesive characteristics.

Our novel addition agents may be satisfactorily employed to reduce the initial viscosity and improve the fluid stability of the ordinary converted starch adhesives and sizes which are obtained by water cooking, chlorination, oxidation, enzyme action, and the like treatment of corn, potato, cassava, wheat, and the like starch-containing materials. Included among our preferred fluid-stabilizing agents are such compounds as monomethylol dicyandiamide, monoethylol dicyandiamide, and the like compounds and their ethylene oxide reaction products, and the lower alkyl-substituted dicyandiamides such as, for example, isopropyl, N-butyl, N-octyl, and the like substituted dicyandiamides. The term "lower" alkyl-substituted and hydroxy-alkyl-substituted, as employed in the present description is to be understood to mean those substituent radicals containing not more than 8 carbon atoms. We have found that alkyl-substituted dicyandiamides containing more than 8 carbon atoms in the alkyl chain are not sufficiently soluble in water to permit their use as fluidifying agents, thus rendering them unsuitable in our novel converted starch compositions.

In addition to the fact that aqueous dispersions of converted starches must possess an initial fluidity such that they may be applied to the paper, textile, leather, etc. fibers according to the means accepted by the art, it is also of importance that the initial pH values of the starch dispersions be maintained without appreciable variance. For example, in employing highly dextrinized starches the initial pH values of the compositions may ordinarily be within the range of from about 2 to about 5 due to the fact that the conversion of the starch is effected in the presence of a mineral acid. Highly dextrinized starches are ordinarily employed as remoistening adhesives for paper envelopes, gummed tapes, labels, and the like. It is often important that the initial acidity of these particular starch compositions be maintained throughout their use inasmuch as their adhesive properties deteriorate with any substantial change in their acidity.

On the other hand, in certain other types of converted starch adhesive applications, near-neutrality or even moderate alkalinity is required. It is of equal importance that this near-neutrality or alkalinity is maintained throughout the use of these particular starch compositions. It will thus be seen that the fluidifying agent to be employed must not appreciably alter the pH value of the particular starch composition employed. It is an outstanding feature of the present invention that our preferred fluidifying agents do not raise or lower to an appreciable extent the pH values of the converted starch compositions to which they are added.

In its broadest aspects, our invention comprises the addition of fluid-stabilizing amounts of the above mentioned substituted dicyandiamides to aqueous dispersions of converted starch to obtain improved initial viscosity therein and to obtain fluid-stable converted starch compositions. We have found that in some instances, notably with monomethylol dicyandiamide, as little as 0.1% of these addition agents, based on the weight of the starch therein, will satisfactorily fluidify and stabilize converted starch compositions. Normally, the most satisfactory initial fluidity of the compositions will be obtained when at least 0.5% to 1% of the addition agents are employed. On the other hand, it is sometimes preferable to employ amounts of our addition agents up to the limits of their solubility in the aqueous starch dispersions. These solubility limits vary from 20–30% in the case of monomethylol dicyandiamide at pH values of 2–3 to 5% to 8% in the case of N-octyl dicyandiamide. Moreover, we have found that converted starches have a solubilizing action on these substituted dicyandiamides so that it is often permissible to employ the maximum quantities of our addition agents to insure the greatest degree of fluid-stability in the converted starch compositions. In particular, it is of decided advantage that such relatively large amounts of our fluidifying agents may be added to acid starch dispersions without seriously affecting the pH values thereof. However, when the starch dispersions are neutral, or nearly so, it is often preferable to use amounts of fluidifying agent not substantially in excess of about 10% of the weight of the starch to obtain optimum initial viscosity and subsequent fluid-stability while not appreciably affecting the pH values of the dispersions. The term "fluid-stabilizing amount" may therefore be defined as the range of amounts of our novel fluidifying agents which may be employed, to impart fluid-stability to converted starch dispersions while maintaining the initial pH values of the dispersions.

Inasmuch as our novel fluid-stabilized converted starch compositions are initially much less viscous than those which have heretofore been employed in the art, it will be seen that the quantities of starch which it is possible to incorporate in paper, leather, textiles, etc. may be increased without seriously interfering with the commonly employed methods of applying such adhesive and sizing compositions thereto. This is particularly important where the converted starch compositions are to be used in conjunction with the addition of various pigments and other fillers. In such uses, it will be readily understood that because of the fluidifying action of the addition agents of the invention, the total solids content of the coating compositions may be increased while maintaining the desirable viscosity and flow characteristics thereof. We are thus enabled to obtain substantial economies in drying the coated paper, while at the same time reducing undesirable penetration of the coating material into the base sheet.

The invention will be more thoroughly explained by the following illustrative examples.

*Example 1*

200 grams of a commercial oxidized corn starch were added to 790 grams of demineralized water. To this mixture was added 10 grams of monomethylol dicyandiamide. After stirring well, the mixture was brought to 190° F. on a steam bath in about one hour, kept at this temperature for 15 minutes, and then cooled. The product was then set aside for periodic viscosity and pH tests, the viscosity determinations being made with a Brookfield viscosimeter at 60 R. P. M. The above described procedure was repeated, employing isopropl dicyandiamide, N-butyl dicyandiamide and N-octyl dicyandiamide as the fluidifying agent. The test results are tabulated below. A control sample was also prepared according to the method set forth above, but without the addition thereto of any fluidifying agent.

| Fluidifying Agent Employed | Brookfield Viscosity in Cp. Aging Time in Hours | | | | | pH Range | Condition of Aged Materials |
|---|---|---|---|---|---|---|---|
| | 2 | 24 | 48 | 72 | 168 | | |
| Control—none | 856 | 1,524 | 1,652 | 2,040 | 2,960 | 6.77–6.95 | Semi-solid gel. |
| 5% Monomethylol dicyandiamide | 760 | 1,084 | 1,236 | 1,268 | 1,500 | 7.00–7.02 | Fluid. |
| 5% Isopropyl dicyandiamide | 692 | 952 | 1,116 | 1,200 | 1,400 | 6.85–7.13 | Do. |
| 5% N-butyl dicyandiamide | 584 | 824 | 840 | 872 | 1,020 | 7.05–7.25 | Do. |
| 5% N-octyl dicyandiamide | 580 | 1,000 | 908 | | 1,400 | 6.73–6.85 | Do. |

*Example 2*

Four starch dispersions were prepared by mixing, in each instance, 68.4 grams of a commercial oxidized corn starch with 231.6 grams of demineralized water (20% starch solids). One sample remained untreated, while to the remaining three dispersions were added 0.1%, 0.5%, and 1% respectively of monomethylol dicyandiamide. All of the samples were then heated on a water bath to 190° F., maintained at this temperature for 15 minutes and then allowed to cool. The samples were then set aside for periodic viscosity and pH tests as in Example 1. Test results are as follows.

| Sample | Brookfield Viscosity in Cp. Aging Time in Hours | | | | | pH Range |
|---|---|---|---|---|---|---|
| | 2 | 24 | 48 | 72 | 168 | |
| Control | 836 | 1,572 | 2,620 | 2,940 | gelled | 7.0–7.1 |
| 0.1% Monomethylol dicyandiamide | 712 | 1,392 | 2,280 | 2,650 | do | 7.1–7.3 |
| 0.5% Monomethylol dicyandiamide | 784 | 1,468 | 2,340 | 2,580 | viscous fluid | 7.1–7.3 |
| 1% Monomethylol dicyandiamide | 616 | 1,056 | 1,860 | 1,940 | fluid | 7.1–7.4 |

Example 3

The procedure of Example 2 was repeated except that 0.1%, 1.0%, and 10.0% of N-butyl dicyandiamide were employed in the preparation of the starch dispersions. Test results follow.

| Sample | Brookfield Viscosity in Cp., Aging Time in Hours | | | | | pH Range |
|---|---|---|---|---|---|---|
| | 2 | 24 | 48 | 72 | 168 | |
| Control | 868 | 1,440 | 2,300 | 2,620 | gelled | 7.0–7.1 |
| 0.1% N-butyl dicyandiamide | 624 | 1,188 | 1,980 | 2,340 | fluid | 7.0–7.3 |
| 1.0% N-butyl dicyandiamide | 744 | 1,336 | 2,180 | 2,320 | do | 7.1–7.3 |
| 10.0% N-butyl dicyandiamide | 108 | 148 | 168 | 168 | very fluid | 7.3–7.4 |

Example 4

Four starch dispersions were prepared by mixing, in each instance, 110.5 grams of a commercial dextrine with 175.2 grams of demineralized water (35% dextrine solids). One sample remained untreated, while to the remaining dispersions were added 5%, 10%, and 20% respectively of monomethylol dicyandiamide. All the samples were then heated on a water bath to 190° F., maintained at this temperature for 15 minutes and then allowed to cool. The samples were then set aside for periodic viscosity and pH tests as in Example 1. Test results are as follows:

| Per Cent of Monomethylol Dicyandiamide Employed | Brookfield Viscosity in Cp., Aging Time in Hours | | | | pH Range | Condition |
|---|---|---|---|---|---|---|
| | 2 | 19 | 43 | 73 | | |
| 0 (Control) | 288 | 720 | 676 | 920 | 2.67–2.73 | Fluid. |
| 5 | 232 | 404 | 460 | 464 | 4.06–4.38 | Do. |
| 10 | 180 | 264 | 324 | 308 | 4.65–4.95 | Do. |
| 20 | 136 | 160 | 156 | 156 | 5.03–5.42 | Do. |

Example 5

In the preparation of a typical coating composition containing 60% solids, and well adapted for application to a sheet of paper either at the paper machine or as a separate operation, 125 grams of converted starch dispersed in 411 grams of water was mixed with 300 grams of a coating clay. 1 gram of $Na_2CO_3$ was added to aid in thoroughly dispersing the clay. The converted starch employed was prepared by cooking in water, as described in Example 1, with 0, 5, 10, and 20% of monomethylol dicyandiamide based on the weight of the starch. The reduction of the coating composition viscosity measured with a Brookfield Viscosimeter at 100 R. P. M. is tabulated below.

| Per Cent Monomethylol Dicyandiamide | Brookfield Viscosity |
|---|---|
| 0 | 16,320 |
| 5 | 10,800 |
| 10 | 8,800 |
| 20 | 6,240 |

Example 6

The above experiment was repeated, employing 500 grams of coating clay and 514 grams of water to prepare a coating composition containing 55% solids. The test results are given below.

| Per Cent Monomethylol Dicyandiamide | Brookfield Viscosity |
|---|---|
| 0 | 9,440 |
| 5 | 5,800 |
| 10 | 4,530 |
| 20 | 3,500 |

It will be seen from the above illustrative examples that the present invention provides converted starch compositions having initial viscosities which are much lower than those which have heretofore been obtained by the art and which, in addition, maintain fluid stability over a relatively long storage period. The present invention also permits the use of increased solids contents in adhesive and sizing compositions.

In some instances, it may be advantageous to compound our fluid-stabilized converted starch compositions with other fluidifying agents and with various plasticizing agents. In this respect urea and the like fluidifying agents, and such plasticizers as glycerine, ethylene glycol, and other polyhydric alcohols or their equivalents may be compounded with our novel converted starch compositions to obtain dried sizing films which are characterized by their improved pliability. Likewise, our novel fluid-stabilized starch composition may be blended in all proportions with other commonly employed sizing materials such as wax sizes, glue, casein, water-soluble resins and cellulose derivatives and various emulsions, as well as with fire proofing, mildew proofing and the like agents.

What we claim is:

A converted starch normally tending to gel when prepared with plain water and allowed to stand but transformed under similar conditions of treatment to substantial fluid stability by the presence therein of a fluid-stabilizing amount of monomethylol dicyandiamide.

CHESTER GREY LANDES.
JOHN STUDENY.

REFERENCES CITED

The following references are of record in the file of this patent:

UNITED STATES PATENTS

| Number | Name | Date |
|---|---|---|
| 2,258,321 | Ericks | Oct. 7, 1941 |
| 2,282,364 | Kunze et al. | May 12, 1942 |
| 2,320,225 | Ericks | May 25, 1943 |
| 2,349,557 | McClellan et al. | May 23, 1944 |
| 2,455,895 | Nagy et al. | Dec. 7, 1948 |